(12) United States Patent
Tseng et al.

(10) Patent No.: US 9,400,893 B2
(45) Date of Patent: Jul. 26, 2016

(54) MULTI-USER LOGIN FOR SHARED MOBILE DEVICES

(75) Inventors: Erick Tseng, San Francisco, CA (US); Eyal Michael Sharon, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/327,534

(22) Filed: Dec. 15, 2011

(65) Prior Publication Data

US 2013/0160141 A1 Jun. 20, 2013

(51) Int. Cl.
*G06F 21/06* (2006.01)
*G06F 21/62* (2013.01)

(52) U.S. Cl.
CPC .................................. *G06F 21/6245* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 2002/0045457 A1 | 4/2002 | Taniguchi | |
| 2003/0139192 A1* | 7/2003 | Chmaytelli et al. | 455/463 |
| 2005/0046580 A1 | 3/2005 | Miranda-Knapp | |
| 2005/0107114 A1* | 5/2005 | Ocock | 455/550.1 |
| 2006/0090085 A1 | 4/2006 | McKenney | |
| 2006/0288234 A1 | 12/2006 | Azar | |
| 2008/0120716 A1 | 5/2008 | Hall | |
| 2008/0255993 A1 | 10/2008 | Blinbaum | |
| 2010/0015976 A1 | 1/2010 | Issa | |
| 2010/0099394 A1 | 4/2010 | Hainzl | |
| 2010/0144315 A1 | 6/2010 | Jayasuriya | |
| 2010/0323664 A1* | 12/2010 | Sivaram et al. | 455/411 |
| 2011/0081889 A1 | 4/2011 | Gao | |
| 2011/0088086 A1 | 4/2011 | Swink | |
| 2011/0105096 A1 | 5/2011 | Dods | |
| 2012/0017094 A1* | 1/2012 | Tulchinsky et al. | 713/182 |
| 2012/0235790 A1 | 9/2012 | Zhao | |

(Continued)

FOREIGN PATENT DOCUMENTS

EP 2 364 004 9/2011
KR 10-2005-0013764 A 2/2005

(Continued)

OTHER PUBLICATIONS

International Search Report and Written Opinion for International Application PCT/US2012/069746, Apr. 5, 2013.

(Continued)

*Primary Examiner* — Brandon Hoffman
*Assistant Examiner* — Nega Woldemariam
(74) *Attorney, Agent, or Firm* — Baker Botts L.L.P.

(57) ABSTRACT

In particular embodiments, two or more users are provided with personalized experiences while using a shared mobile computing device. A login interface is presented for a plurality of users of the shared mobile computing device. When an indication of a login action by a first user of the plurality of users is detected, access to restricted information associated with any other user of the plurality of users is disabled. Cached information associated with the first user is retrieved from a local data store. A personalized user interface is then presented, based on the cached information. Updates to information and/or content may be cached and/or stored remotely. When an indication of a logout action by a first user of the plurality of users is detected, particular information and/or content is flushed from the local data store.

20 Claims, 6 Drawing Sheets

(56) References Cited

U.S. PATENT DOCUMENTS

| 2012/0246739 A1 | 9/2012 | Mebed |
| 2012/0262271 A1 | 10/2012 | Torgersrud |
| 2013/0007665 A1 | 1/2013 | Chaudhri |
| 2013/0063611 A1 | 3/2013 | Papakipos |

FOREIGN PATENT DOCUMENTS

| KR | 10-2005-0032816 A | 4/2005 |
| KR | 10-2011-0041110 | 4/2011 |
| KR | 10-2011-0043012 | 4/2011 |
| KR | 10-2011-0043492 | 4/2011 |
| KR | 10-2011-0055137 | 5/2011 |
| WO | WO 2012/088974 | 7/2012 |
| WO | WO 2013/090718 | 6/2013 |
| WO | WO 2014/066451 | 5/2014 |

OTHER PUBLICATIONS

U.S. Appl. No. 13/571,160, filed Aug. 9, 2012, Matus.
U.S. Appl. No. 13/662,187, filed Oct. 26, 2012, Matus.
U.S. Appl. No. 14/537,704, filed Nov. 10, 2014, Matus.
European Patent Office Search Report for Application No. 13189504.7-1958, Feb. 5, 2014.
International Search Report and Written Opinion for International Application No. PCT/US2013/066279, Feb. 7, 2014.
Non-Final Office Action for U.S. Appl. No. 13/571,160, Oct. 1, 2014.
Non-Final Office Action for U.S. Appl. No. 13/662,187, Oct. 22, 2013.
Response to Non-Final Office Action for U.S. Appl. No. 13/662,187, Jan. 22, 2014.
Final Office Action for U.S. Appl. No. 13/662,187, May 21, 2014.
Response to Final Office Action for U.S. Appl. No. 13/662,187, Sep. 18, 2014.
Notice of Allowance for U.S. Appl. No. 13/662,187, Oct. 15, 2014.

* cited by examiner

MULTI-USER LOGIN FOR SHARED MOBILE DEVICES

BACKGROUND

Mobile computing and communication devices, such as cellphones, PDAs, tablet computers, and mini-laptops have become prevalent in recent years. Such mobile devices are often tied to a specific individual and therefore contain personal information, including account information, user profile information, and pre-authorized and pre-authenticated access to Internet-connected applications with further access to personal, private, and/or confidential information. This may present a problem when a mobile device storing personal information is to be shared between two or more users, such as, for example, within a family.

INTRODUCTION

The present disclosure relates generally to mobile computing and communication devices associated with personal, private, and/or confidential information, and more specifically relates to personalization and data security in relation to such devices.

The figures depict various embodiments of the present disclosure for purposes of illustration only. One skilled in the art will readily recognize from the following discussion that alternative embodiments of the structures and methods illustrated herein may be employed without departing from the principles of the invention described herein.

DESCRIPTION OF EXAMPLE EMBODIMENT(S)

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Overview

Particular embodiments relate to a social networking environment including a social networking system and related systems that include conventional stationary as well as mobile embodiments. A social networking system offers its users the ability to communicate and interact with other users of the social networking system. Users join the social networking system and then add connections to a number of other users to whom they desire to be connected. Once they are members of the social network, the users may interact with the social network itself, by viewing and posting images and video on their own page, or by using shared mobile computing devices to view and post location-based social networking information.

In particular embodiments, multiple users may share a single mobile computing device. Such a shared mobile computing device may be personalized for each user while preserving fast login for each user by caching particular information, such as, for example, certain device and software settings, including user interface settings, content-related information, etc.

When the shared mobile computing device utilizes software, e.g., an operating system and/or applications, that relies upon personal information (including not only private or confidential information, but also any user-specific, user-entered, or user-generated information) to provide a personalized experience, the shared mobile computing device may need to restrict access to the personal information so that any given user does not gain access to other users' information.

Figure 1:
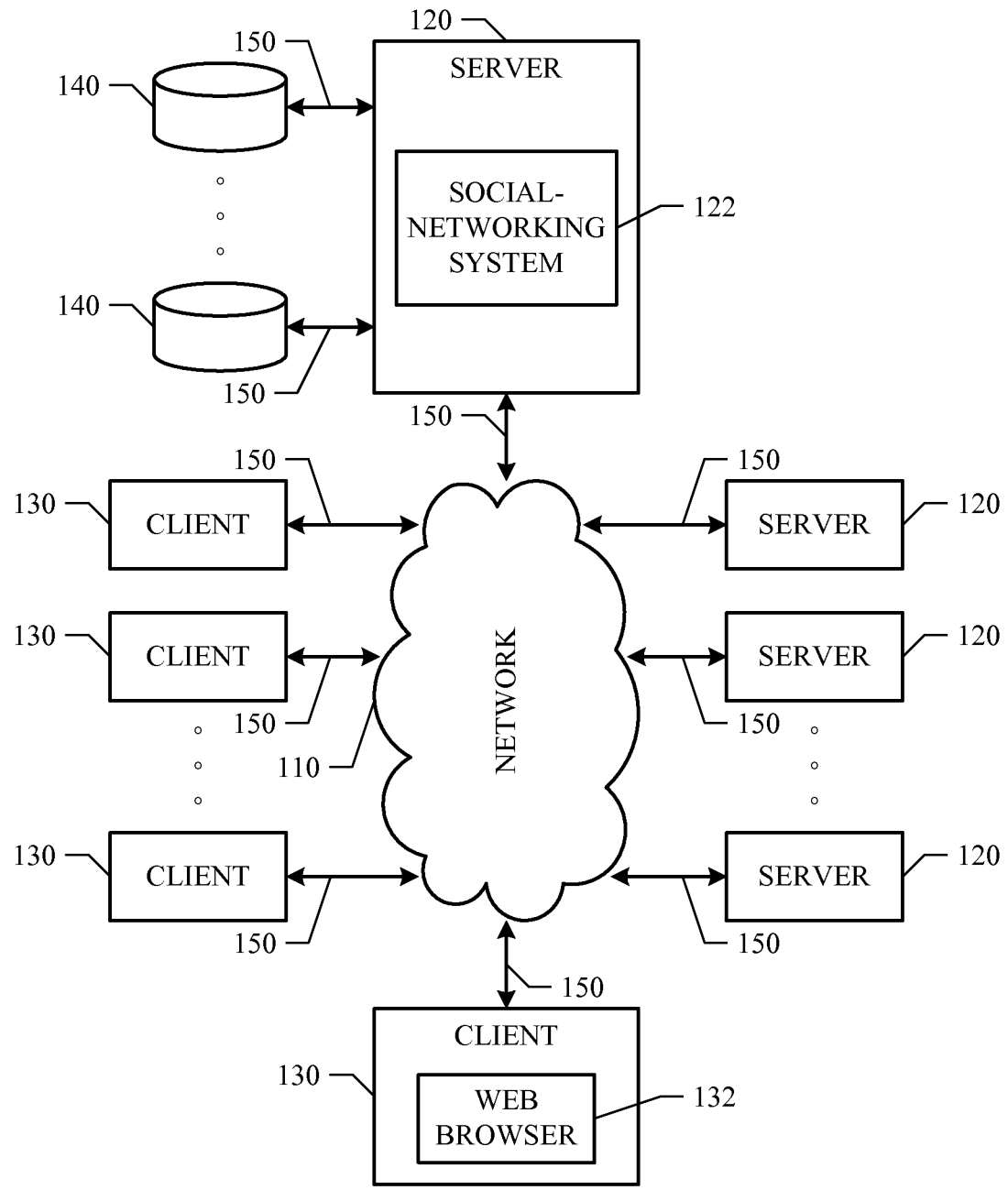
FIG. 1 illustrates an example network architecture associated with a social network.

FIG. 1 illustrates an example network environment 100. Network environment 100 includes a network 110 coupling one or more servers 120 and one or more clients 130 to each other. In particular embodiments, network 110 is an intranet, an extranet, a virtual private network (VPN), a local area network (LAN), a wireless LAN (WLAN), a wide area network (WAN), a metropolitan area network (MAN), a portion of the Internet, a cellular technology-based network, a satellite communications technology-based network, or another network 110 or a combination of two or more such networks 110. This disclosure contemplates any suitable network 110.

One or more links 150 couple a server 120 or a client 130 to network 110. In particular embodiments, one or more links 150 each includes one or more wireline, wireless, or optical links 150. In particular embodiments, one or more links 150 each includes an intranet, an extranet, a VPN, a LAN, a WLAN, a WAN, a MAN, a portion of the Internet, a cellular technology-based network, a satellite communications technology-based network, or another link 150 or a combination of two or more such links 150. This disclosure contemplates any suitable links 150 coupling servers 120 and clients 130 to network 110.

In particular embodiments, each server 120 may be a unitary server or a distributed server spanning multiple computers or multiple datacenters. Servers 120 may be of various types, such as, for example and without limitation, web server, news server, mail server, message server, advertising server, file server, application server, exchange server, database server, proxy server, another server suitable for performing functions and/or processes described herein, or any combination thereof. In particular embodiments, each server 120 may include hardware, software, or embedded logic components or a combination of two or more such components for carrying out the appropriate functionalities implemented or supported by server 120. In particular embodiments, each server 120 may include may include hardware, software, or embedded logic components or a combination of two or more such components for carrying out data communications, which may be based on a protocol. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores. In particular embodiments, a social-networking system 122 may be hosted on a server 120. In particular embodiments, server 120 may transmit data using a protocol, e.g., HTTP, TCP, UDP, MQTT, WAP, ICMP, POP3, SMTP, FTP, IMAP, IIOP, RMI, DCOM, DDE, SOAP, Mobile IP, XOT, IRC, SNMP, SOCKS, SHTTP, SMS, SMSTP, MMS, or any other conventional protocol, or any combination thereof.

In particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. In particular embodiments, each data storage 140 may be a relational database. Particular embodiments may provide interfaces that enable servers 120 or clients 130 to manage, e.g., retrieve, modify, add, or delete, the information stored in data storage 140.

In particular embodiments, each client 130 may be an electronic device including hardware, software, or embedded logic components or a combination of two or more such components and capable of carrying out the appropriate functionalities implemented or supported by client 130. For example and without limitation, a client 130 may comprise a computer system such as: a desktop computer, a notebook or laptop, a netbook, a tablet, an e-book reader, a GPS device, a camera, a personal digital assistant (PDA), a handheld electronic device, a mobile telephone, or another similar processor-based electronic device. This disclosure contemplates any suitable clients 130. A client 130 may enable a network user at client 130 to access network 130. A client 130 may enable its user to communicate with other users at other clients 130. In particular embodiments, a client device 130 may comprise a shared mobile computing device 200 as described in FIGS. 2A and 2B.

A client 130 may have a web browser 132, such as MICROSOFT® INTERNET EXPLORER®, GOOGLE CHROME™ or MOZILLA FIREFOX®, and may have one or more add-ons, plug-ins, or other extensions, such as TOOLBAR or YAHOO TOOLBAR®. A user at client 130 may enter a Uniform Resource Locator (URL) or other address directing the web browser 132 to a server 120, and the web browser 132 may generate a Hyper Text Transfer Protocol (HTTP) request and communicate the HTTP request to server 120. Server 120 may accept the HTTP request and communicate to client 130 one or more Hyper Text Markup Language (HTML) files responsive to the HTTP request. Client 130 may render a web page based on the HTML files from server 120 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVA-SCRIPT®, JAVA®, MICROSOFT® SILVERLIGHT®, combinations of markup language and scripts such as AJAX (Asynchronous JAVASCRIPT® and XML), and the like. Herein, reference to a web page encompasses one or more corresponding web page files (which a browser may use to render the web page) and vice versa, where appropriate.

FIG. 2A illustrates an example shared mobile computing device 200. In particular embodiments, shared mobile computing device 200 may comprise a processor 210, a memory 220, a communication component 230 (e.g., antenna and communication interface for wireless communications), one or more input and/or output (I/O) components and/or interfaces 240, and one or more sensors 250. In particular embodiments, one or more I/O components and/or interfaces 240 may incorporate one or more sensors 250. In particular embodiments, shared mobile computing device 200 may comprise a computer system or and element thereof as described in FIG. 6 and associated description.

In particular embodiments, a shared mobile computing device, such as a mobile device, may include various types of sensors 250, such as, for example and without limitation: touch sensors (disposed, for example, on a display of the device, the back of the device and/or one or more lateral edges of the device) for detecting a user touching the surface of the mobile electronic device (e.g., using one or more fingers); an audio sensor (e.g., a microphone), an accelerometer for detecting whether the shared mobile computing device 200 is moving and the speed of the movement; a thermometer for measuring the temperature change near the shared mobile computing device 200; a proximity sensor for detecting the proximity of the shared mobile computing device 200 to another object (e.g., a hand, desk, or other object); a light sensor for measuring the ambient light around the shared mobile computing device 200; an imaging sensor (e.g., camera) for capturing digital still images and/or video of objects near the shared mobile computing device 200 (e.g., scenes, people, bar codes, QR codes, etc.); location sensors (e.g., Global Positioning System (GPS)) for determining the location (e.g., in terms of latitude and longitude) of the mobile electronic device; sensors for detecting communication networks, device, or objects within close proximity (e.g., near field communication (NFC), Bluetooth, RFID, infrared); chemical sensors; biometric sensors for biometrics-based (e.g., fingerprint, palm vein pattern, hand geometry, iris/retina, DNA, face, voice, olfactory, sweat) authentication of user of shared mobile computing device 200; etc. This disclosure contemplates that a mobile electronic device may include any applicable type of sensor. Sensors may provide various types of sensor data, which may be analyzed to determine the user's intention with respect to the mobile electronic device at a given time.

In particular embodiments, a sensors hub 260 may optionally be included in shared mobile computing device 200. Sensors 250 may be connected to sensors hub 260, which may be a low power-consuming processor that controls sensors 250, manages power for sensors 250, processes sensor inputs, aggregates sensor data, and performs certain sensor functions. In addition, in particular embodiments, some types of sensors 250 may be connected to a controller 270. In this case, sensors hub 260 may be connected to controller 270, which in turn is connected to sensor 250. Alternatively, in particular embodiments, there may be a sensor monitor in place of sensors hub 260 for managing sensors 250.

In particular embodiments, in addition to the front side, shared mobile computing device 200 may have one or more sensors for performing biometric identification. Such sensors may be positioned on any surface of shared mobile computing device 200. In example embodiments, as the user's hand touches shared mobile computing device 200 to grab hold of it, the touch sensors may capture the user's fingerprints or palm vein pattern. In example embodiments, while a user is viewing the screen of shared mobile computing device 200, a camera may capture an image of the user's face to perform facial recognition. In example embodiments, while a user is viewing the screen of shared mobile computing device 200, an infrared scanner may scan the user's iris and/or retina. In example embodiments, while a user is in contact or close proximity with shared mobile computing device 200, chemical and/or olfactory sensors may capture relevant data about a user. In particular embodiments, upon detecting that there is a change in state with respect to the identity of the user utilizing shared mobile computing device 200, either by itself or in combination with other types of sensor indications, shared mobile computing device 200 may determine that it is being shared.

In particular embodiments, in addition to the front side, the shared mobile computing device 200 may have touch sensors on the left and right sides. Optionally, the shared mobile computing device 200 may also have touch sensors on the back, top, or bottom side. Thus, as the user's hand touches shared mobile computing device 200 to grab hold of it, the touch sensors may detect the user's fingers or palm touching shared mobile computing device 200. In particular embodiments, upon detecting that there is a change in state with respect to a user touching shared mobile computing device 200, either by itself or in combination with other types of sensor indications, shared mobile computing device 200 may determine that it is being shared.

In particular embodiments, shared mobile computing device 200 may have an accelerometer in addition to or instead of the touch sensors on the left and right sides. Sensor data provided by the accelerometer may also be used to estimate whether a new user has picked up shared mobile computing device 200 from a resting position, e.g., on a table or desk, display shelf, or from someone's hand or from within someone's bag. When the user picks up shared mobile computing device 200 and brings it in front of the user's face, there may be a relatively sudden increase in the movement speed of shared mobile computing device 200. This change in the device's movement speed may be detected based on the sensor data supplied by the accelerometer. In particular embodiments, upon detecting that there is a significant increase in the speed of the device's movement, either by itself or in combination with other types of sensor indications, shared mobile computing device 200 may determine that it is being shared.

In particular embodiments, shared mobile computing device 200 may have a Gyrometer in addition or instead of the touch sensors on the left and right sides. A Gyrometer, also known as a gyroscope, is a device for measuring the orientation along one or more axis. In particular embodiments, a Gyrometer may be used to measure the orientation of shared mobile computing device 200. When shared mobile computing device 200 is stored on a shelf or in the user's bag, it may stay mostly in one orientation. However, when the user grabs hold of shared mobile computing device 200 and lifts it up and/or moves it closer to bring it in front of the user's face, there may be a relatively sudden change in the orientation of shared mobile computing device 200. The orientation of shared mobile computing device 200 may be detected and measured by the gyrometer. If the orientation of shared mobile computing device 200 has changed significantly, In particular embodiments, upon detecting that there is a significant change in the orientation of shared mobile computing device 200, either by itself or in combination with other types of sensor indications, shared mobile computing device 200 may determine that it is being shared.

In particular embodiments, shared mobile computing device 200 may have a light sensor. When shared mobile computing device 200 is stored in a user's pocket or case, it is relatively dark around shared mobile computing device 200. On the other hand, when the user brings shared mobile computing device 200 out of his pocket, it may be relatively bright around shared mobile computing device 200, especially during day time or in well-lit areas. The sensor data supplied by the light sensor may be analyzed to detect when a significant change in the ambient light level around shared mobile computing device 200 occurs. In particular embodiments, upon detecting that there is a significant increase in the ambient light level around shared mobile computing device 200, either by itself or in combination with other types of sensor indications, shared mobile computing device 200 may determine that it is being shared.

In particular embodiments, shared mobile computing device 200 may have a proximity sensor. The sensor data supplied by the proximity sensor may be analyzed to detect when shared mobile computing device 200 is in close proximity to a specific object, such as the user's hand. For example, mobile device 200 may have an infrared LED (light-emitting diode) 290 (i.e., proximity sensor) placed on its back side. When the user holds such a mobile device in his hand, the palm of the user's hand may cover infrared LED 290. As a result, infrared LED 290 may detect when the user's hand is in close proximity to mobile device 200. In particular embodiments, upon detecting that shared mobile computing device 200 is in close proximity to the user's hand, either by itself or in combination with other types of sensor indications, shared mobile computing device 200 may determine that it is being shared.

A shared mobile computing device 200 may have any number of sensors of various types, and these sensors may supply different types of sensor data. Different combinations of the individual types of sensor data may be used together to detect and estimate a user's current intention with respect to shared mobile computing device 200 (e.g., whether the user really means to take shared mobile computing device 200 out of his pocket and use it). Sometimes, using multiple types of sensor data in combination may yield a more accurate, and thus better, estimation of the user's intention with respect to shared mobile computing device 200 at a given time than only using a single type of sensor data. Nevertheless, it is possible to estimate the user's intention using a single type of sensor data (e.g., touch-sensor data).

Figure 2:
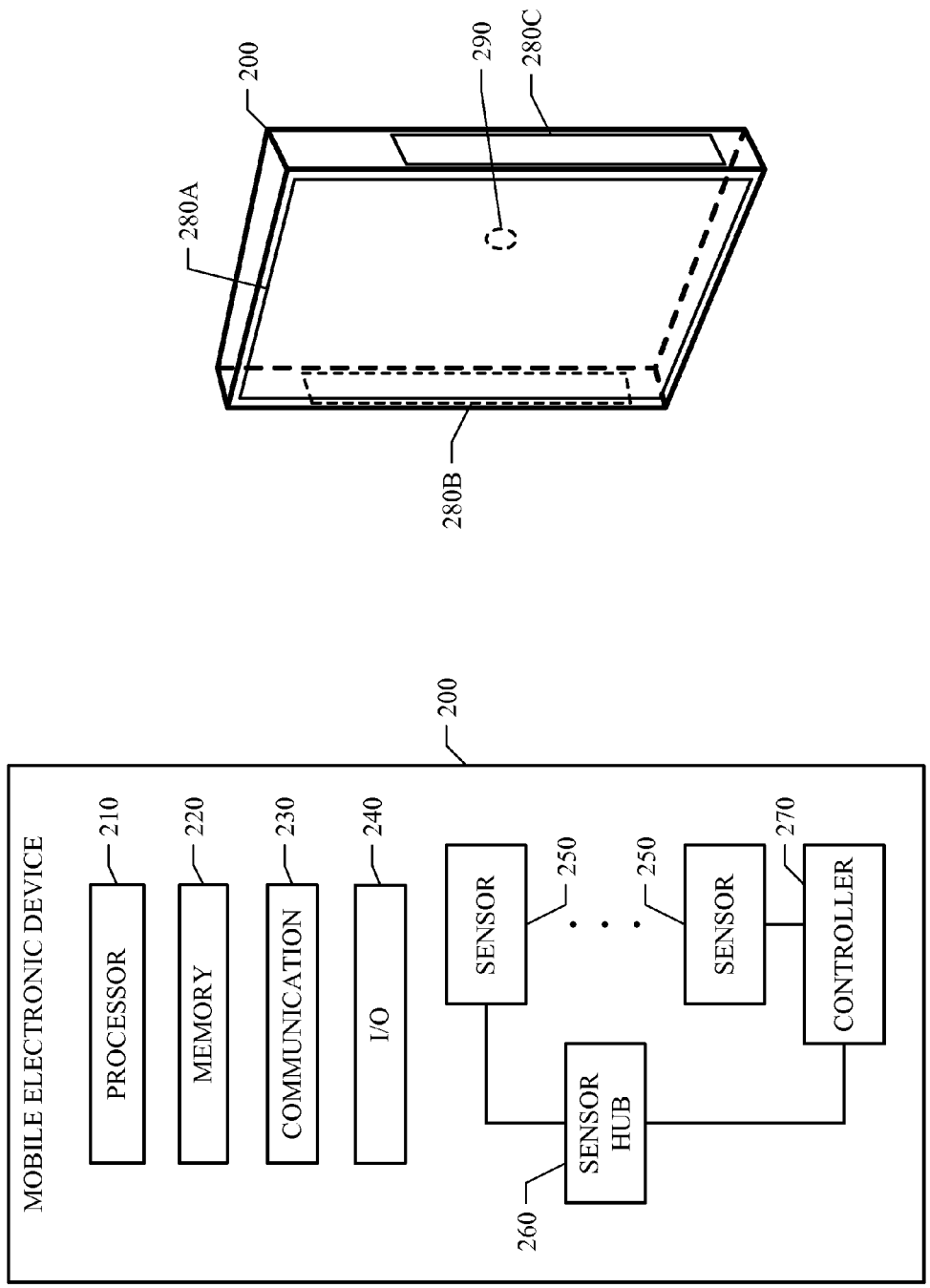
FIGS. 2A-B illustrate an example shared mobile computing device.

FIG. 2B illustrates the exterior of an example shared mobile computing device 200. Shared mobile computing device 200 has approximately six sides: front, back, top, bottom, left, and right. Touch sensors may be placed anywhere on any of the six sides of shared mobile computing device 200. For example, in FIG. 2, a touchscreen incorporating touch sensors 280A is placed on the front of shared mobile computing device 200. The touchscreen may function as an input/output (I/O) component for shared mobile computing device 200. In addition, touch sensors 280B and 280C are placed on the left and right sides of shared mobile computing device 200, respectively. Touch sensors 280B and 280C may detect a user's hand touching the sides of shared mobile computing device 200. In particular embodiments, touch sensors 280A, 280B, 280C may be implemented using resistive, capacitive, and/or inductive touch sensors. The electrodes of the touch sensors 280A, 280B, 280C may be arranged on a thin solid piece of material or a thin wire mesh. In the case of capacitive touch sensors, there may be two types of electrodes: transmitting and receiving. These electrodes may be connected to a controller (e.g., controller 270 illustrated in FIG. 2), which may be a microchip designed to drive the transmitting electrodes with electrical pulses and measure the changes in capacitance from the receiving electrodes caused by a user's touches in order to detect the locations of the user touches.

Of course, shared mobile computing device 200 is merely an example. In practice, a device may have any number of sides, and this disclosure contemplates devices with any number of sides. The touch sensors may be placed on any side of a device.

In particular embodiments, shared mobile computing device 200 may have a proximity sensor 290 (e.g., an infrared LED) placed on its back side. Proximity sensor 290 may be able to supply sensor data for determining its proximity, and thus the proximity of shared mobile computing device 200, to another object.

Figure 3:
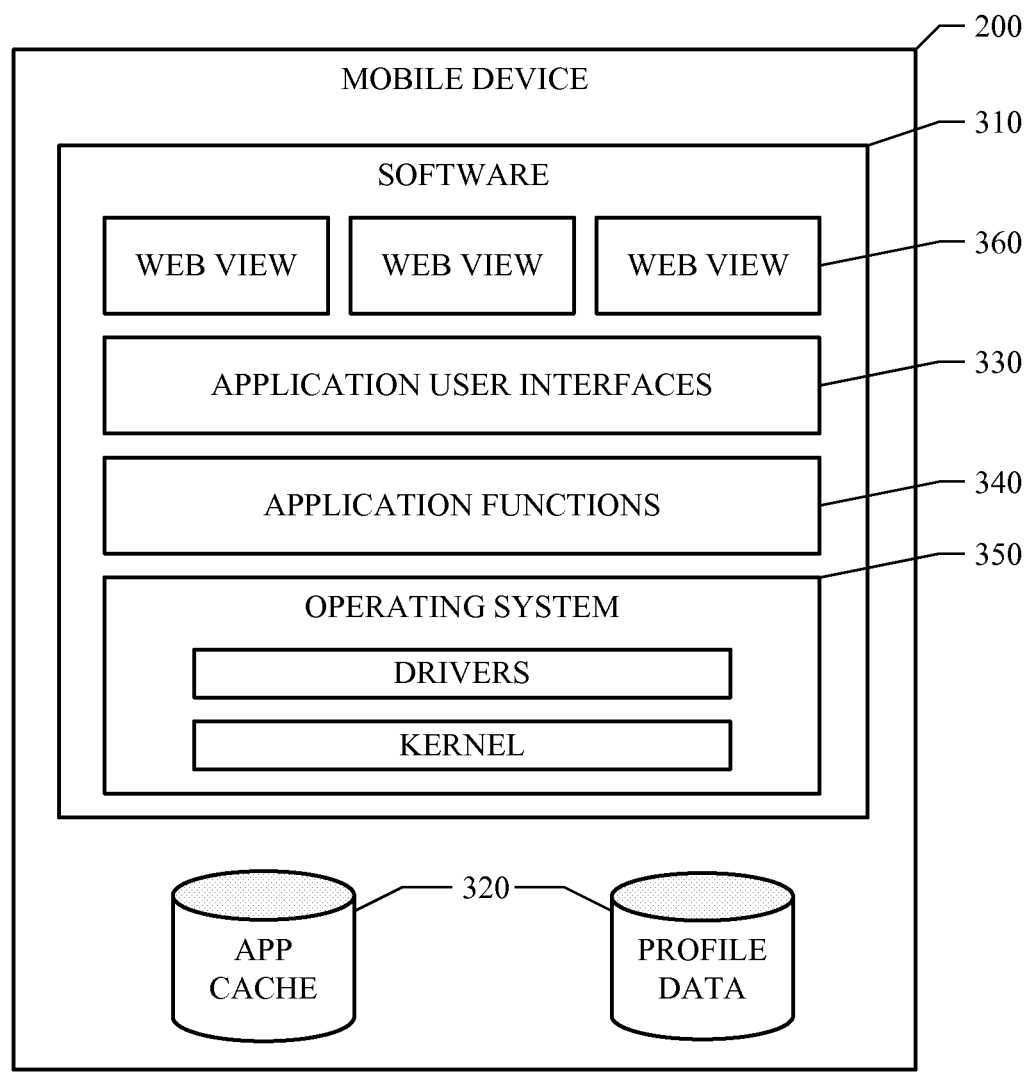
FIG. 3 illustrates an example software architecture for information and applications on a shared mobile computing device.

FIG. 3 illustrates an example software architecture 300 for information and applications on a shared mobile computing device 200. In particular embodiments, software architecture 300 may comprise software 310 and data store(s) 320. In particular embodiments, personal information may be stored in an application data cache 320 and/or a profile data store 320 and/or another data store 320. In particular embodiments, one or more software applications may be executed on shared mobile computing device 200. In particular embodiments, they may be web-based applications hosted on servers. For example, a web-based application may be associated with a URI (Uniform Resource Identifier) or URL (Uniform Resource Locator). From shared mobile computing device 200, a user may access the web-based application through its associated URI or URL (e.g., by using a web browser). Alternatively, in other embodiments, they may be native applications installed and residing on shared mobile computing device 200. Thus, software 310 may also include any number of application user interfaces 330 and application functions 340. For example, a mapping and navigation application (e.g., GOOGLE MAPS) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using shared mobile computing device 200; a fifth application may allow the device user to receive and initiate VoIP and/or cellular network calls, and so on. Each application has one or more specific functionalities, and the software (e.g., one or more software modules) implementing these functionalities may be included in application functions 340. Each application may also have a user interface that enables the device user to interact with the application, and the software implementing the application user interface may be included in application user interfaces 330. In particular embodiments, the functionalities of an application may be implemented using JAVASCRIPT, JAVA, C, or other suitable programming languages. In particular embodiments, the user interface of an application may be implemented using HyperText Markup Language (HTML), JAVASCRIPT, JAVA, or other suitable programming languages.

In particular embodiments, the user interface of an application may include any number of screens or displays. In particular embodiments, each screen or display of the user interface may be implemented as a web page. Thus, the device user may interact with the application through a series of screens or displays (i.e., a series of web pages). In particular embodiments, operating system 350 is GOOGLE'S ANDROID mobile technology platform.

With ANDROID, there is a JAVA package called "android.webkit," which provides various tools for browsing the web. Among the "android.webkit" package, there is a Java class called "android.webkit.WebView", which implements a View for displaying web pages. This class uses the WebKit rendering engine to display web pages and includes methods to navigate forward and backward through a history, zoom in, zoom out, perform text searches, and so on. In particular embodiments, an application user interface 330 may utilize Android's WebView application programming interface (API) to display each web page of the user interface in a View implemented by the "android.webkit.WebView" class. Thus, in particular embodiments, software 310 may include any number of web views 360, each for displaying one or more web pages that implement the user interface of an application.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, a web view 360 or application user interfaces 330. Each input event may be forwarded to application functions 340, or application functions 340 may listen for input events thus generated. When application functions 340 receive an input event, the appropriate software module in application functions 340 may be invoked to process the event. In addition, specific functionalities provided by operating system 350 and/or hardware (e.g., as described in FIGS. 1 and 2A-B) may also be invoked. For example, if the event is generated as a result of the user pushing a button to take a photo with shared mobile computing device 200, a corresponding image processing module may be invoked to convert the raw image data into an image file (e.g., JPG or GIF) and store the image file in the storage 320 of shared mobile computing device 200. As another example, if the event is generated as a result of the user selecting an icon to compose an instant message, the corresponding short message service (SMS) module may be invoked to enable the user to compose and send the message.

In particular embodiments, when an output of the application is ready to be presented to the user, an event (e.g., an output event) may be generated by, for example, a software module in application functions 340 or operating system 350. Each output event may be forwarded to application user interfaces 330, or application user interfaces 330 may listen for output events thus generated. When application user interfaces 330 receive an output event, it may construct a web view 360 to display a web page representing or containing the output. For example, in response to the user selecting an icon to compose an instant message, an output may be constructed that includes a text field that allows the user to input the message. This output may be presented to the user as a web page and displayed to the user in a web view 360 so that the user may type into the text field the message to be sent.

The user interface of an application may be implemented using a suitable programming language (e.g., HTML, JAVASCRIPT, JAVA). More specifically, in particular embodiments, each web page that implements a screen or display of the user interface may be implemented using a suitable programming language. In particular embodiments, when a web view 360 is constructed to display a web page (e.g., by application user interfaces 330 in response to an output event), the code implementing the web page is loaded into web view 360.

Figure 4B:
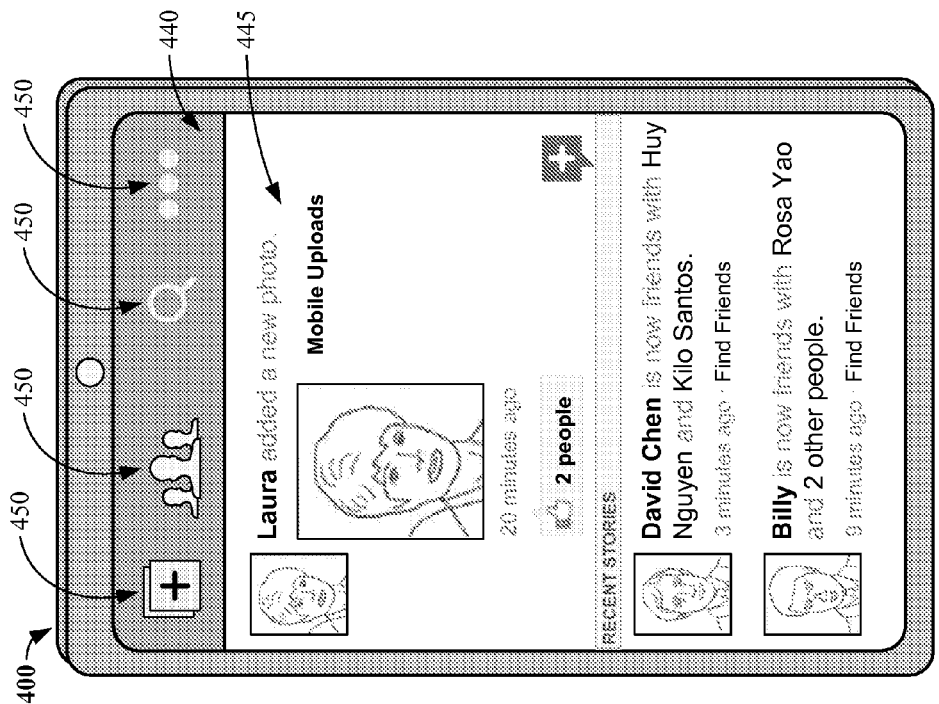
FIGS. 4A-B illustrate example wireframes of a user interface for a shared mobile computing device.
Figure 4A:
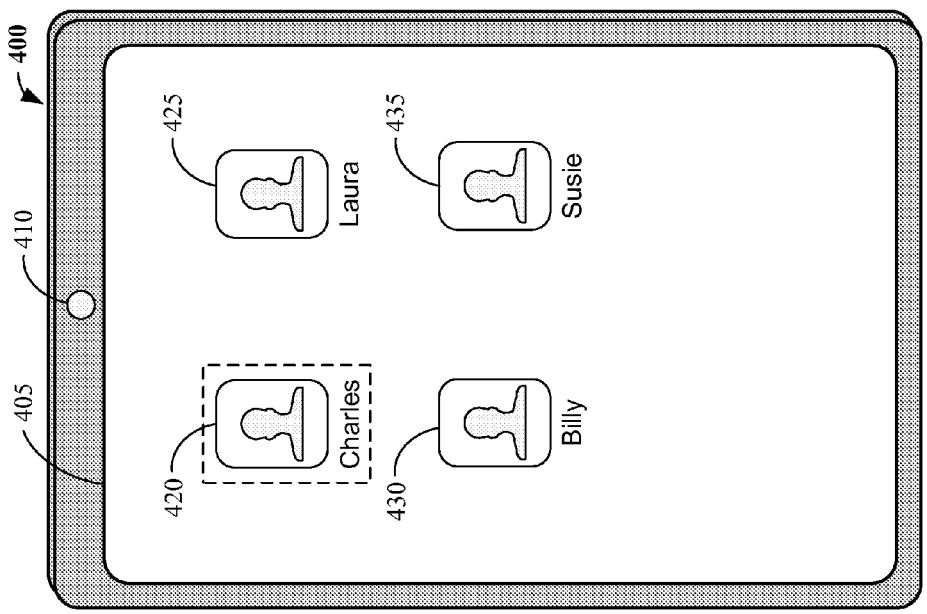

FIGS. 4A and 4B illustrate an example user interface for a shared mobile computing device 400 as described above. In particular embodiments, shared mobile computing device 400 includes a touch screen 405 and sensor(s) 410. FIG. 4A illustrates a user interface for one or more users to log in to a shared mobile computing device 400. Touch screen 405 of the shared mobile computing device 400 presents a selection of users of the shared mobile computing device 400: Charles 420, Laura 425, Billy 430, and Susie 435. In particular embodiments, the users may all be members of a group, such as a family, a group of classmates, roommates or housemates, coworkers, or any other group of users that might share a mobile device such as shared mobile computing device 400.

In the example scenario in FIG. 4A, an indication of a login action was detected with respect to user Charles 420. This indication may comprise one or more explicit actions by user Charles 420, such as, e.g., clicking on an image, icon, or text on touch screen 405, entering a password or other code, executing a unique gesture with respect to touch screen 405, reciting a voice command or phrase (e.g., "Log in as Charles") in conjunction with biometric voice identification, etc. This indication may comprise one or more implicit actions by user Charles 420 that is detected by sensor(s) 410 of shared mobile computing device 400, such as, e.g., grasping shared mobile computing device 400 in such a manner so as to enable biometric identification based on fingerprints or hand geometry, or chemical sensors, looking into an imaging sensor so as to enable biometric identification based on face geometry or patterns in the iris or the retina, etc. In particular embodiments, the indication of a login action may comprise any combination of explicit action(s) and implicit action(s).

In particular embodiments, after the indication of a login action is detected, the user may be required to take additional steps to authenticate their identity and/or authorize them to access data and functionality on shared mobile computing device 400. For example, if the indication of a login action comprised detection of a click upon the icon for user Charles 420, the user may then be required to enter a password or custom gesture previously designated by user Charles 420.

FIG. 4B illustrates an example user interface that appears on the shared mobile computing device 400 once the user has logged in. In particular embodiments, shared mobile computing device 400 loads the user's cached information upon successful login, so that the example user interface shown in FIG. 4B is personalized for the user. In particular embodiments, any cached information of any other user(s) of shared mobile computing device 400 is securely hidden, deleted, or disabled prior to presenting the personalized user interface for the user.

Aspects of personalization may be related to: software and related data, content, and settings. Aspects of personalization related to software and related data may include: the selection of applications that are available, pre-authentication for applications that access remote data, application configuration settings, dashboard/desktop configuration, browser bookmarks, calendar items, phone contact list, social network contacts, personal status/messaging/email history, notifications and alarms, geolocation-related information and saved locations, search history, personal profile data and/or history, list of most-contacted friends, and/or other aspects.

Aspects of personalization related to content may include music playlists, music or sound clips that are available for playback, photo album information, photos and/or videos that are available for viewing, e-book lists and libraries, game-related content, documents, email, notes, downloaded attachments to communications, downloaded applications, media libraries, map tiles, and/or other aspects. Aspects of personalization related to content may vary in accordance with whether the content was purchased and/or uploaded and/or downloaded and/or captured by the user.

Aspects of personalization related to settings may include user interface settings, device configuration settings, network configuration settings; power consumption and/or conservation settings, ringtones, notification modes, time zone, time/date format, device-based security settings, privacy settings, application-based authentication and/or authorization settings, a custom dictionary and auto-correct settings, auto-complete settings, audio settings, notification settings, accessibility settings (e.g., for disabled or physically- or mentally-challenged users), language settings, voicemail settings, display settings, font settings, synchronization settings, etc.

Touch screen 405 displays menu region 440 and content region 445. In particular embodiments, display aspects of shared mobile computing device 400 may be personalized for the user: brightness; touch input sensitivity; mouse and/or scrolling speed; power conservation settings; etc. In particular embodiments, aspects of menu region 440 and content region 445 may be personalized for the user: background color and/or wallpaper; font attributes, such as size, style, or color; arrangement and/or format and/or font and/or size of icons and text; content update frequency; user interface layout and elements, etc. In the example user interface shown in FIG. 4B, menu region 440 displays one or more icons 450 to access various functions, for example: Add (to your network, e.g., people, websites, groups, etc.), Inbox (for email, text messages, etc.), Notifications (of events, invitations to connect, incoming communications, etc.), Search (for people, locations, websites, events, media, applications, etc.), Update Status (with text and/or image(s)), Settings (for local device settings and/or network account settings), More Menu Options, etc.

Any aspect of shared mobile computing device 400 that could be personalized for a given user or group of users is encompassed within the scope of this invention.

Figure 5:
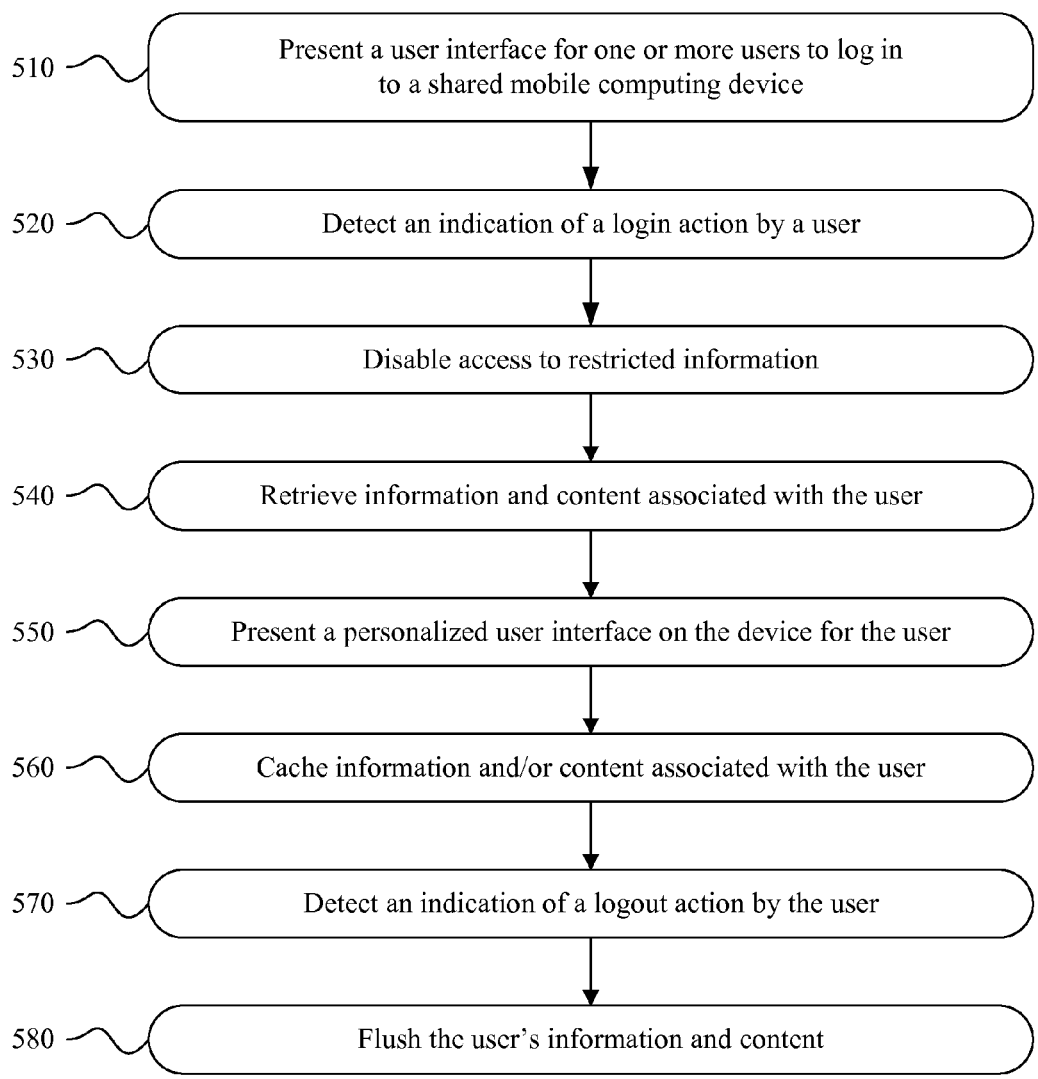
FIG. 5 illustrates a process flow of an example embodiment for utilizing a shared mobile computing device.

FIG. 5 illustrates a process flow of an example embodiment for particular embodiments to utilize a shared mobile computing device. In particular embodiments, one or more steps of the process flow illustrated in FIG. 5 may not be required.

In step 510, the shared mobile computing device presents a user interface for one or more users associated with the shared mobile computing device to log in. In particular embodiments, the shared mobile computing device displays a user profile picture and/or a display name or username for each of the plurality of users.

In step 520, the shared mobile computing device detects an indication of a login action by a user. In particular embodiments, an indication of a login action may include one or more of the following: detection of a user input transmitted by an input element associated with the shared mobile computing device, including, for example, a voice command, a signal from an accelerometer associated with the shared mobile computing device, a signal from a biometric identification sensor associated with the shared mobile computing device, a signal from a remote control device associated with the shared mobile computing device, or any analogous action or event.

In step 530, the shared mobile computing device disables access to restricted information of other users of the shared mobile computing device. In particular embodiments, restricted information may include information designated by the user as private or confidential, information associated with settings configured by the user, information created by the user, information generated by user-initiated actions, or any combination thereof. In particular embodiments, disabling access comprises one or more of the following actions: disabling access to the local data store, switching to an alternate local data store, clearing a local cache, disabling or deleting cookies, disabling or deleting an authorization token, disabling or deleting security certificates, disabling or deleting other user profile information, or similar actions. In particular embodiments, the local data store is partitioned so as to provide one partition for each user of the shared mobile computing device; disabling access to restricted information of other users may comprise enabling access to only the partition associated with the user who is logged in. In such embodiments where the local data store is partitioned, each partition may be separately encrypted.

In step 540, the shared mobile computing device retrieves cached information and/or content associated with the user from a local data store. In particular embodiments, only that information required to support fast user login and user switching is cached. Cached information may include user-identifying information (e.g., user IDs, email addresses), a user profile picture, a display name, user-configured device settings for the shared mobile computing device, user-configured software settings for software executable by one or more processors associated with the shared mobile computing device, user authentication information, user authorization information, information associated with communications to or from the user, information associated with contacts of the user, information associated with purchases made by the user, information associated with an account of the user, location information, user history information, user preference information, or any combination thereof.

In particular embodiments, for each user of shared mobile computing device, cached information associated with the user is stored in a separate partition of the local data store. In particular embodiments, each such partition is encrypted. In particular embodiments, shared mobile computing device 400 is configured to access only one partition at any given time. In particular embodiments, the local data store may also include a shared partition for storing information and/or content that is common to or shared between two or more users of the shared mobile computing device.

In particular embodiments, the shared mobile computing device may also retrieve remotely-stored information and/or content associated with the user. In particular embodiments, the remote data store is accessible by a network interface of the shared mobile computing device. Remotely-stored information and/or content may include cached information, remote updates to cached information, information and/or content that is too large to store in the local data store, information and/or content that tends to be updated or modified very often, highly-sensitive information and/or content, information and/or content for which the user must pay and/or subscribe, information and/or content associated with advertisements, information and/or content associated with access restrictions, and any other type of information and/or content.

In step 550, the shared mobile computing device presents a personalized user interface based on the cached information. In particular embodiments, one or more aspects of the shared mobile computing device are personalized as described above with respect to FIG. 4B.

In step 560, the shared mobile computing device caches updates to information and/or content associated with the user. In particular embodiments, updates to information and/or content associated with the first user are also stored in the remote data store.

In step 570, the shared mobile computing device detects an indication of a logout action by a user. In particular embodiments, an indication of a logout action may include one or more of the following: instructions to detect a user input transmitted by an input element associated with the shared mobile computing device, a voice command, a signal from an accelerometer associated with the shared mobile computing device, a signal from a biometric identification sensor associated with the shared mobile computing device, a signal from a remote control device associated with the shared mobile computing device, an incoming call, an incoming text message, a timeout, a power cycle, a device reset, or any analogous action or event.

In particular embodiments, the shared mobile computing device may include a heightened privacy mode, wherein the shared mobile computing device is configured to detect when someone other than the logged-in user is looking at or picking up or attempting to utilize the shared mobile computing device. The shared mobile computing device may be able to detect that a user other than the primary user is attempting to use or view the device, for example, by means of biometric identification techniques. For example, if a logged-in user puts their device down on a table, and a second user picks up the device without the logged-in user's knowledge, the device may detect the motion of the second user picking up the device (e.g., using embedded touch sensors, an accelerometer, and/or a gyroscope), perform biometric identification on the second user (e.g., using a camera to perform facial recognition, using a scanner to scan the user's iris, retina, fingerprints, and/or palm veins, and/or using chemical or olfactory sensors), determine that the second user is not the logged-in user, and either hide the logged-in user's screen or simply log the user out and present a login UI for the second user to log in. In particular embodiments, the shared mobile computing device may display or transmit a notification to the logged-in user about the event.

In step 580, the shared mobile computing device flushes the logged-out user's information and/or content. In particular embodiments, only particular information associated with the user is flushed from the local data store so that only that information required to enable fast user login is retained. The selection of which particular information to flush may be based on one or more of the following: available space in the local data store, a maximum storage quota placed upon the user, one or more attribute(s) associated with the particular information, user preferences, or any other similar or comparable bases. Relevant attributes associated with information may include a created timestamp, a last-accessed timestamp, an expiration timestamp, a usage statistic, a popularity statistic, a size, an information type, a category, a deletion indicator, an obsolescence indicator, a version, permission settings, the owner of the information, the group associated with the information, or any other similar or comparable attributes. The information type may include personal information, content, auto-generated data, restricted information, or some combination thereof.

Flushing information and/or content may be accomplished by disabling access to a local data store or partition thereof, switching to an alternate data store or partition thereof, switching to an alternate cache, clearing a local cache, disabling or deleting cookies, disabling or deleting an authorization token, disabling or deleting security certificates, disabling or deleting other user profile information, or any combination thereof.

Figure 6:
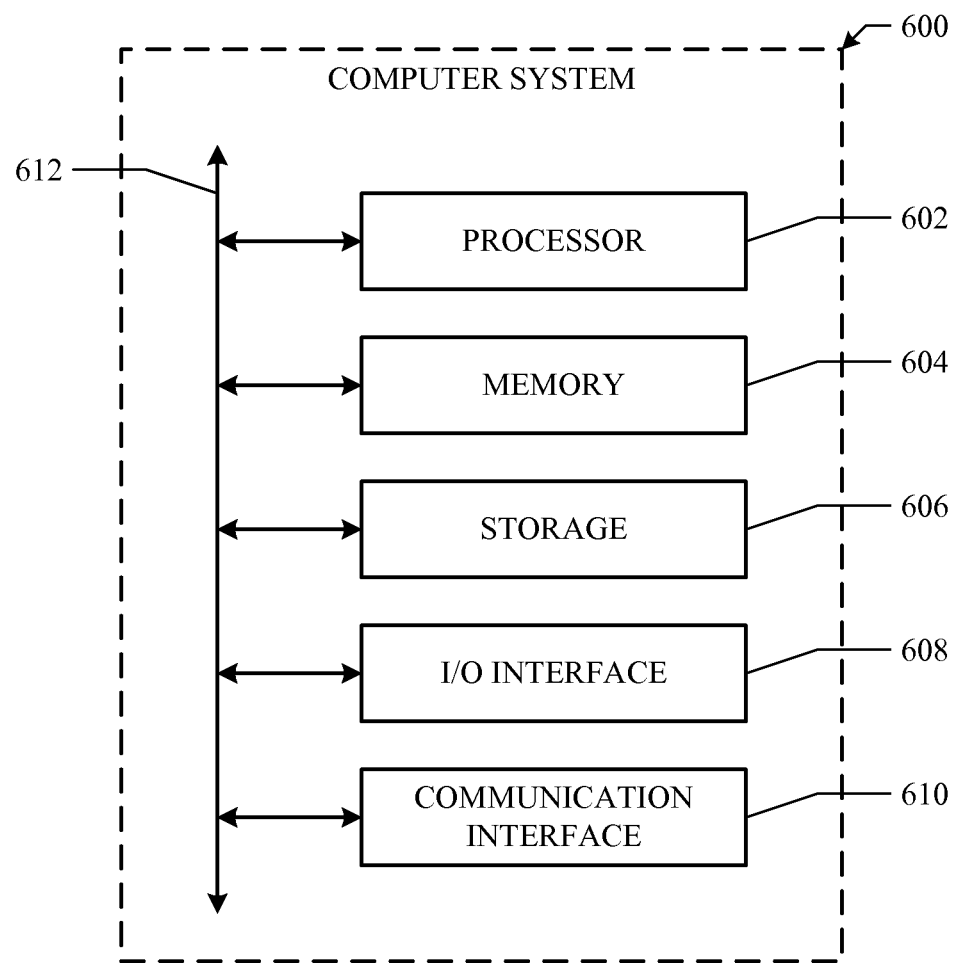
FIG. 6 illustrates an example computer system for performing particular embodiments.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple datacenters; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 02 to memory 604. Bus 612 may include one or more memory buses, as described below. In particular embodiments, one or more memory management units (MMUs) reside between processor 602 and memory 604 and facilitate accesses to memory 604 requested by processor 602. Although this disclosure describes and illustrates particular memory, this disclosure contemplates any suitable memory.

In particular embodiments, storage 606 includes mass storage for data or instructions. Storage 606 may include removable or non-removable (i.e., fixed) media, where appropriate. Storage 606 may be internal or external to computer system 600, where appropriate. In particular embodiments, storage 606 is non-volatile, solid-state memory. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it. Although this disclosure describes and illustrates a particular communication interface, this disclosure contemplates any suitable communication interface.

In particular embodiments, bus 612 includes hardware, software, or both coupling components of computer system 600 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A shared mobile computing device, comprising:
a local data store;
one or more non-transitory machine-readable storage media encoded with instructions; and
a processor configured to execute the instructions to:
present a login interface for a plurality of users of the shared mobile computing device;
detect an indication of a login action by a first user of the plurality of users;
disable access to restricted personal information associated with any other user of the plurality of users;
retrieve cached settings information associated with the first user from the local data store;
retrieve personal information associated with the first user from a third party system, the personal information being based on interactions of the first user with one or more other entities of the third party system;
present a personalized user interface based on the cached settings information and the retrieved personal information;
detect an indication of a user logout action; and
upon detection of the logout action, delete, from the local data store, particular information associated with the first user.

2. The device of claim 1, wherein the restricted personal information associated with the any other user of the plurality of users comprises information designated by the any other user as private or confidential, information associated with settings configured by the any other user, information created by the any other user, or information generated by user-initiated actions.

3. The device of claim 1, wherein the retrieved personal information comprises user-identifying information, a user profile picture, a display name, user authentication information, user authorization information, information associated with communications to or from the user, information associated with contacts of the user, information associated with purchases made by the user, information associated with an account of the user, location information, user history information, or user preference information; and
the cached settings information comprises user-configured device settings for the shared mobile computing device, or user-configured software settings for software executable by one or more processors associated with the shared mobile computing device.

4. The device of claim 1, wherein the instructions to detect the indication of the login action comprises instructions to detect a voice command, a signal from an accelerometer associated with the shared mobile computing device, a signal from a biometric identification sensor associated with the shared mobile computing device, a signal from a remote control device associated with the shared mobile computing device, a user input transmitted by an input element associated with the shared mobile computing device, or any combination thereof.

5. The device of claim 1, wherein the local data store comprises one or more partitions, each partition being associated with one user of the plurality of users, and wherein the instructions to disable access to restricted personal information associated with any other user of the plurality of users comprises instructions to enable access only to the partition associated with the first user.

6. The device of claim 5, wherein each partition of the local data store is separately encrypted.

7. The device of claim 1, wherein the instructions to disable access to restricted personal information associated with the any other user of the plurality of users comprises instructions to disable access to the local data store, switch to an alternate local data store, clear a local cache, disable or delete cookies, disable or delete an authorization token, disable or delete security certificates, or disable or delete other user profile information.

8. The device of claim 1, wherein the cached settings information or the retrieved personal information comprises brightness, touch input sensitivity, pointer speed, scrolling speed, power conservation settings, background color, wallpaper, font attributes, arrangement of icons, format of icons, font of icons, size of icons, arrangement of text, format of text, font of text, size of text, content update frequency, user interface layout, user interface elements, network configuration settings, power consumption or conservation settings, ringtones, notification modes, time zone, time/date format, device-based security settings, authentication settings, authorization settings, a custom dictionary and auto-correct settings, auto-complete settings, audio settings, notification settings, language settings, voicemail settings, the selection of applications that are available, pre-authentication for applications that access remote data, application configuration settings, dashboard and/or desktop configuration, browser bookmarks, calendar items, phone contact list, social network contacts, personal status history, messaging history, email history, notifications and alarms, geolocation-related information, saved locations, search history, email, notes, downloaded attachments to communications, or downloaded applications.

9. The device of claim 1, further comprising instructions to cache, in the local data store, updates to the cached settings information or the retrieved personal information associated with the first user.

10. The device of claim 1, further comprising instructions to store, in a remote data store, updates to the cached settings information or the retrieved personal information associated with the first user.

11. The device of claim 1, wherein the instructions to detect the indication of the logout action comprise instructions to detect a user input transmitted by an input element associated with the shared mobile computing device, a voice command, a signal from an accelerometer associated with the shared mobile computing device, a signal from a biometric identification sensor associated with the shared mobile computing device, a signal from a remote control device associated with the shared mobile computing device, an incoming call, an incoming text message, a timeout, a power cycle, a device reset, or any combination thereof.

12. The device of claim 1, further comprising instructions to select the particular information to delete based on available space in the local data store, a maximum storage quota placed upon the first user, an attribute associated with the particular information, or any combination thereof.

13. The device of claim 12, wherein the attribute associated with the particular information comprises a created timestamp, a last-accessed timestamp, an expiration timestamp, a usage statistic, a popularity statistic, a size, an information type, a category, a deletion indicator, an obsolescence indicator, or any combination thereof.

14. The device of claim 13, wherein the information type comprises personal information, content, auto-generated data, restricted information, or any combination thereof.

15. The device of claim 1, wherein the instructions to delete comprise instructions to clear a local cache, delete cookies, delete an authorization token, disable or delete security certificates, delete other user profile information, or any combination thereof.

16. The device of claim 1, wherein the instructions to detect the indication of the logout action comprise instructions to detect a second user attempting to interact with the device before the first user has performed the logout action.

17. The device of claim 16, wherein the instructions to detect a second user attempting to interact with the device comprise instructions to detect the second user looking at the device, picking up the device, attempting to utilize the device, or some combination thereof.

18. A method comprising:
presenting, on a shared mobile computing device comprising a local data store, a login interface for a plurality of users of the shared mobile computing device;
detecting an indication of a login action by a first user of the plurality of users;
disabling access to restricted personal information associated with any other user of the plurality of users;
retrieving cached settings information associated with the first user from the local data store;
retrieving personal information associated with the first user from a third party system, the personal information being based on interactions of the first user with one or more other entities of the third party system;
presenting a personalized user interface on the shared mobile computing device based on the cached personal information cached settings information and the retrieved personal information;
detecting an indication of a user logout action; and
upon detection of the logout action, delete, from the local data store, particular information associated with the first user.

19. One or more computer-readable non-transitory storage media embodying software that is operable when executed by one or more processors associated with a shared mobile computing device to:
present, on the shared mobile computing device comprising a local data store, a login interface for a plurality of users of the shared mobile computing device;
detect an indication of a login action by a first user of the plurality of users;
disable access to restricted personal information associated with any other user of the plurality of users;
retrieve cached settings information associated with the first user from the local data store;
retrieve personal information associated with the first user from a third party system, the personal information being based on interactions of the first user with one or more other entities of the third party system;
present a personalized user interface based on the cached settings information and the retrieved personal information;
detect an indication of a user logout action; and
upon detection of the logout action, delete, from the local data store, particular information associated with the first user.

20. The media of claim 19, wherein the local data store comprises one or more encrypted partitions, each partition being associated with one user of the plurality of users, and wherein the instructions to disable access to the restricted personal information associated with the any other user of the plurality of users comprises instructions to enable access only to the partition associated with the first user.

* * * * *